Figure 1:
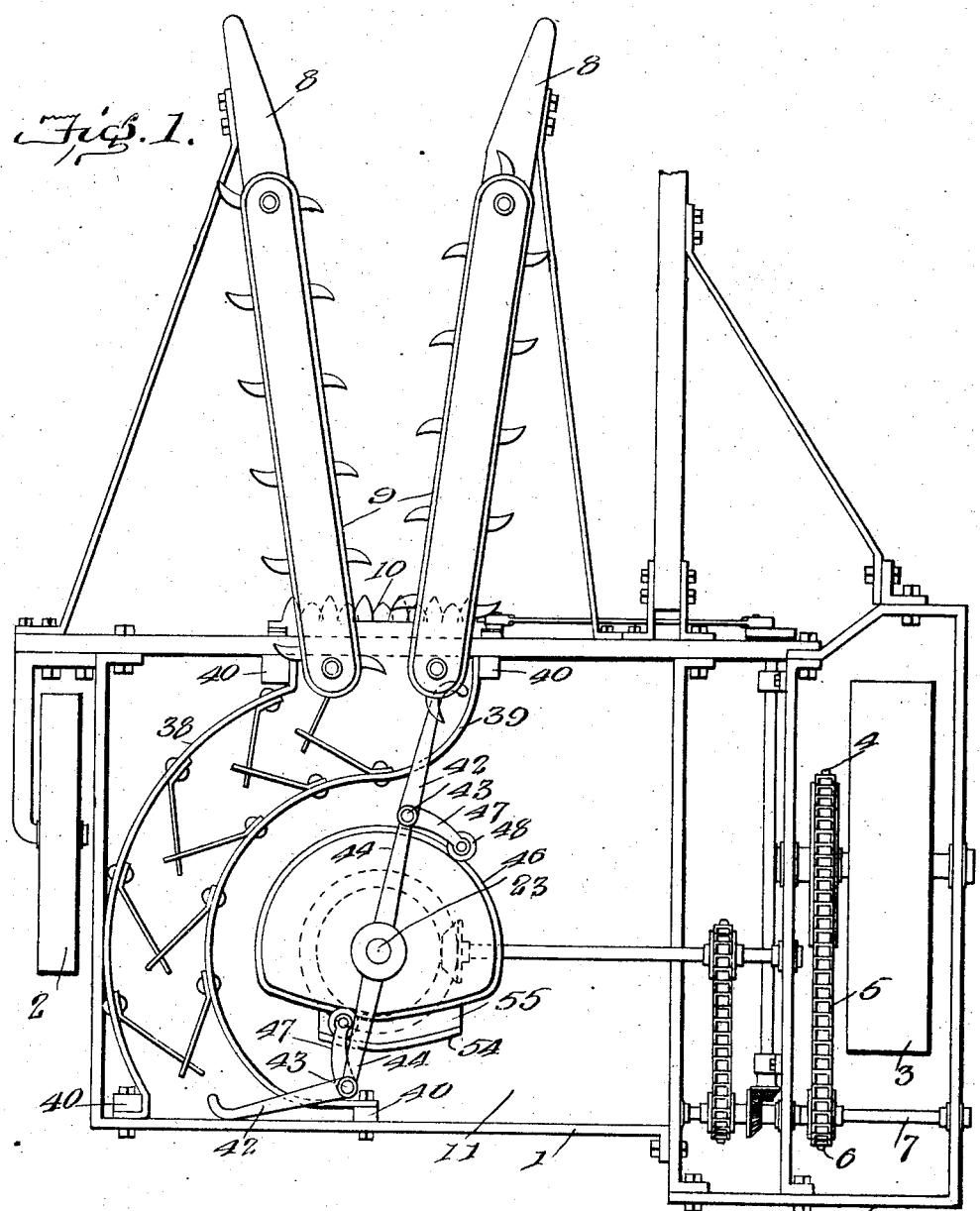

No. 851,059. PATENTED APR. 23, 1907.
H. BROOME.
CORN HARVESTER.
APPLICATION FILED JULY 27, 1906.

2 SHEETS—SHEET 1.

Witnesses
G. Howard Walmsley
Edward L. Reed

Inventor
Henry Broome,
By H. A. Toulmin,
Atty

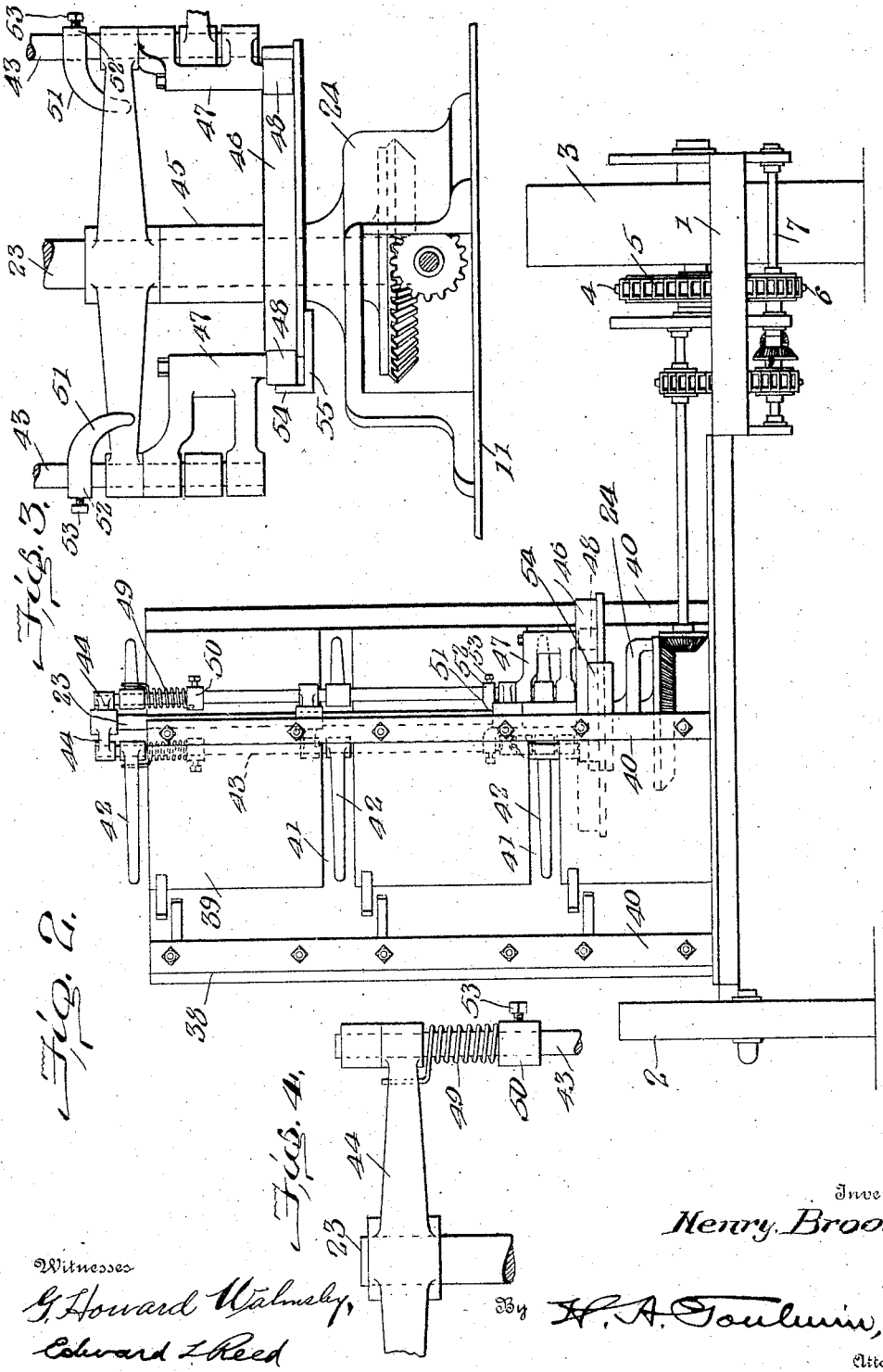

UNITED STATES PATENT OFFICE.

HENRY BROOME, OF SPRINGFIELD, OHIO, ASSIGNOR OF ONE-THIRD TO WILLIAM DENNICK, OF DAYTON, OHIO, AND ONE-THIRD TO CLAUDE W. FLICK, OF SPRINGFIELD, OHIO.

CORN-HARVESTER.

No. 851,059.     Specification of Letters Patent.     Patented April 23, 1907.

Original application filed May 14, 1906, Serial No. 316,644. Divided and this application filed July 27, 1906. Serial No. 327,987.

*To all whom it may concern:*

Be it known that I, HENRY BROOME, a citizen of the United States, residing at Springfield, in the county of Clark and State of Ohio, have invented certain new and useful Improvements in Corn-Harvesters, of which the following is a specification, reference being had therein to the accompanying drawings.

My invention relates to corn-harvesters, and more particularly to the conveyers employed in such harvesters for carrying the cornstalks which have been cut through the guideways to the rear of the machine, where they are received upon a platform; and the object of the invention is to provide a conveyer of this character which will carry the stalks through the guideway and withdraw from the same without interfering with the stalks immediately following the arm.

A further object is to provide such a conveyer that will be positively driven and the action of which will be certain and efficient.

In the drawings, Figure 1 is a plan view of the machine embodying my invention in one form. Fig. 2 is a rear elevation of the same. Fig. 3 is a side elevation of the lower portion of the conveyer, and Fig. 4 is a similar view of the upper portion of the conveyer.

The present application is a division of the application filed by me May 14, 1906, Serial No. 316,644, and in the drawings I have illustrated a machine embodying my invention in one form, in which 1 is the main frame of the machine, supported at its opposite ends on ground-wheels 2 and 3, of which 3 is the drive-wheel and which is provided with a sprocket 4 and sprocket-chain 5, passing around the sprocket 6 on the drive-shaft 7. This frame is provided at its forward end with gathering-in arms 8, of any suitable character, provided with gathering-in conveyers 9, adapted to carry the stalks of corn back to the cutting mechanism 10, which is located at the rear of the gathering-in arms, both the gathering-in conveyers and the cutting mechanism being operated through suitable connections from the driving-shaft 7, all of which forms no part of the present invention and is not shown in detail, but is included in another application.

The frame 1 is provided with a deck or floor portion 11, supporting the mechanism herein described. Mechanism is provided for conveying in an upright position the severed stalks thus delivered by the gathering-conveyers at the front of the machine, said conveying mechanism carrying the stalks to the rear of the machine and there delivering them to the tender or shocking-receptacle. The conveying mechanism comprises two curved upright guides 38 and 39, arising from the platform 11, their front ends extending forward to and embracing the rear ends of the gathering-conveyers 10. These guides are supported by uprights or posts 40 at their front and rear ends, and the inner guide 39 is slotted horizontally, as indicated at 41, to permit the passage of the conveyer-arms. These conveyer-arms (indicated by the reference-numeral 42) are shown in the present instance as comprising two groups composed of three arms each, although obviously the number of groups and the number of arms in each group may be varied. Each group of conveyer-arms 42 is mounted on a rock-shaft 43, supported in vertical position in bearing-arms 44, which project radially from the top and bottom of the portion of the conveyer-shaft 23 which extends above the bearing-sleeve 45 of the bracket 24. The rock-shafts 43 are moved to different positions by means of a fixed cam 46 to cause the conveyer-arm 42 to project into operative position across the guideway formed between the guides 38 and 39 and to withdraw or retract said arms to permit them to clear the tender and the rear supporting-post 40 of the inner guide 39.

The cam 46 is secured to the bracket 45, and the lower ends of the rock-shafts 43 are provided with arms 47, secured thereon and carrying antifriction-rollers 48, adapted to bear against the margin of the cam 46. The rock-shafts 43 are acted on by springs which serve to hold the rollers 48 in contact with the cam 46. The arrangement I prefer for this purpose is that shown, in which each rock-shaft has coiled on it below the upper cross-arm 44 of the conveyer-shaft 23 a spring 49, one end of which is secured to a collar 50, fast on the rock-shaft, while the other end bears against the arm 44 in such a way as to tend to rotate the rock-shaft 43 in the proper direction. In order to prevent this spring from turning the rock-shaft on which it is mounted too far, each rock-shaft is provided near its lower end above the lower cross-arm 44 with a stop projection or finger 51, secured to a collar 52, which is fastened to the rock-shaft by means of a set-screw 53, as is also the collar 50. This stop prevents the spring from throwing the arm 47 past the central line connecting the rock-shaft 43 and conveyer-shaft 23 when the roller 48 is at the point of minimum eccentricity of the cam. Said roller is additionally guided by means of an outer guide-flange 54, extending along this portion of the cam parallel with the margin thereof, said guide-flange being carried by a bracket or plate 55, secured to the under side of the cam 46.

The operation of the device as herein described will be obvious. As the cornstalks are fed by the gathering-in conveyer past the cutting mechanism and between the upright guides they are pushed forward by the outer ends of the conveyer-arms, these arms being held in extended position by the roller carried by the guide-arm and bearing against the face of the fixed cam. As these arms travel in a circle, they follow the path of the curved guide and carry the cornstalks steadily forward until they reach a point near the rear end thereof, when the roller passes over the angle in the cam and allows the arm to drop back on its pivot to a position parallel with the frame and transverse to the movement of the cornstalks, and in this position it is withdrawn from between the stalks without interfering with the onward movement of the same.

I wish it to be understood that I do not desire to be limited to the exact details of construction shown and described, for obvious modifications will occur to a person skilled in the art.

Having thus fully described my invention, what I claim as new, and desire to secure by Letters Patent, is—

1. In a device of the character described, the combination, with a main frame having cutting mechanism and upright guides forming a guideway thereon, of a conveyer provided with pivoted arms adapted to extend across said guideway, and a fixed cam acting to change the angular position of the arms as they approach the rear of the main frame to maintain said arms in substantial parallelism with the transverse axis of the main frame, whereby said arms clear the frame and are withdrawn lengthwise from contact with the stalks to prevent moving the same laterally, substantially as described.

2. In a corn-harvester of the character described, the combination, with guides forming a guideway for the stalks, of a reel comprising a vertically-revolving conveyer-shaft having arms secured thereon, rock-shafts mounted in said arms, conveyer-arms on said rock-shafts, a fixed cam, and traveling arms secured to the rock-shafts and bearing on said cam, said rock-shafts being provided with springs to hold the traveling arms against the cam and with stop-arms to limit the spring-actuated movement of the rock-shafts, substantially as described.

3. In a device of the character described, the combination, with the guides forming a guideway, of a conveyer comprising a vertically-revolving shaft, a hub carried thereby, radial arms secured to said hub, conveyer-arms pivoted to the outer end of said radial arms and adapted to extend across said guideway, and means for controlling the position of said conveyer-arms with relation to said guideway to maintain said arms at substantially right angles thereto and to withdraw the same lengthwise from the stalks to prevent moving the same laterally, substantially as described.

4. In a corn-harvester of the character described, the combination, with guides forming a guideway for the stalks, of a conveyer comprising a vertically-revolving shaft, a series of hubs on said shaft, radial arms carried by said hubs, conveyer-arms pivotally secured to the outer end of said radial arms and adapted to extend across said guideway, means for controlling the position of said conveyer-arms relatively to said guideway to maintain said arms at substantially right angles thereto and to withdraw the same lengthwise from the stalks to prevent moving the same laterally, substantially as described.

5. In a corn-harvester of the character described, the combination, with guides forming a guideway for the stalks, of a conveyer comprising a vertically-revolving shaft, a series of hubs carried thereby, radial arms secured to said hubs, rock-shafts mounted in said radial arms, conveyer-arms carried by said rock-shafts, collars secured to said rock-shafts, arms mounted on the lower end of said rock-shafts, rollers carried by said arms and engaging a cam to control the movement of said conveyer-arms, and springs surrounding said shafts and having one end engaging said collar and the opposite end bearing against the conveyer-arm, substantially as described.

In testimony whereof I affix my signature in presence of two witnesses.

HENRY BROOME.

Witnesses:
E. O. HAGAN,
EDWARD L. REED.